United States Patent [19]

Guerin

[11] Patent Number: 4,507,599

[45] Date of Patent: Mar. 26, 1985

[54] METHOD AND DEVICE FOR CONTROLLING A STEPPING MOTOR

[75] Inventor: Yves Guerin, Granges, Switzerland

[73] Assignee: ETA S.A., Fabriques d'Ebauches, Granges, Switzerland

[21] Appl. No.: 537,088

[22] Filed: Sep. 29, 1983

[30] Foreign Application Priority Data

Oct. 13, 1982 [CH] Switzerland ........................ 5974/82

[51] Int. Cl.[3] ............................................ H02K 29/04

[52] U.S. Cl. .................................... 318/696; 318/685

[58] Field of Search ............ 318/696, 685; 310/49 R; 368/76, 85, 157, 160

[56] References Cited

FOREIGN PATENT DOCUMENTS 0062273 10/1982 European Pat. Off. .
2402340 3/1979 France .
2410843 6/1979 France .
2450527 9/1980 France .

*Primary Examiner*—S. J. Witkowski

*Assistant Examiner*—Saul M. Bergmann

*Attorney, Agent, or Firm*—Spensley Horn Jubas & Lubitz

[57] ABSTRACT

The rotor of a stepping motor may remain blocked in an intermediate position different from a rest position if its control circuit adjusts the electric energy of the driving pulses to the minimum corresponding to the actual mechanical load of the motor determined by a measuring circuit. To remove this risk, the method consists in producing with the aid of a generator and applying to the motor, pulses which allow release of the rotor when it has remained blocked in an intermediate position in response to a driving pulse. The release pulses are distinct from any correction pulses which are applied in known manner to make up a lost step. The release pulses precede the correction pulses and are preferably of such polarity as to return the rotor to its starting position to ensure correct action of the ensuing correction pulses.

This method applies in particular to the control of the stepping motor of an electronic timepiece.

8 Claims, 11 Drawing Figures

METHOD AND DEVICE FOR CONTROLLING A STEPPING MOTOR

BACKGROUND OF THE INVENTION

1. Field of the Invention

The present invention is concerned with a method for controlling a stepping motor comprising a coil, a rotor coupled magnetically to the coil and means for bringing the rotor into, or maintaining it in, at least one given rest position in the absence of current in the coil.

The present invention is also concerned with a device for controlling such a stepping motor.

2. Description of the Prior Art

The electric energy necessary for driving the mechanical elements connected to a stepping motor is generally supplied by a control circuit which delivers a driving pulse every time the motor is to advance by one step. The driven elements may be the elements such as hands and/or discs displaying the time information given by an electronic timepiece.

A considerable reduction in the electric energy consumed by the motor can be obtained by providing in the control circuit a circuit which adjusts the energy of the driving pulses to the minimum corresponding to the actual mechanical load driven by the motor. There are various types of circuits for measuring this actual mechanical load and adjusting the energy of the driving pulses.

U.S. Pat. No. 4,212,156, for example, describes a control circuit in which the duration of each driving pulse is already determined before it begins. A detector circuit measures the time that elapses between the end of each driving pulse and the appearance of the first minimum of the current induced in the coil by the oscillations of the rotor about its position of equilibrium.

If this time is small, this indicates that the load driven by the rotor during this driving pulse was likewise small and therefore that the rotor has certainly finished its step. The control circuit does not modify the duration of the following driving pulses or, according to circumstances, reduces this duration. If, on the other hand, this time is long, this indicates that the load driven by the rotor was considerable and that the rotor has perhaps not turned in response to this driving pulse. The control circuit then sends a correction pulse of long duration and of the same polarity as the driving pulse which has just finished and increases the duration of the following driving pulse.

In such circuits, the detection of the rotation or non-rotation of the rotor is therefore effected immediately, or almost immediately, after each driving pulse. These circuits will be called immediate detection circuits in the following description.

U.S. Pat. No. 4,300,233 describes another kind of control circuit in which the duration of each driving pulse is predetermined. In this circuit, a detector circuit measures the intensity of the current flowing in the coil of the motor about two milliseconds after the beginning of each driving pulse. If this intensity is lower than a predetermined value, this indicates that the rotor is in the correct position for turning in response to this driving pulse and therefore that it has turned in response to the preceding driving pulse. If this intensity is higher than the predetermined value, this indicates that the rotor is not in the correct position and therefore that it has not turned in response to the preceding driving pulse. The control circuit then interrupts the driving pulse in progress, sends to the motor a correction pulse of the same polarity as the preceding driving pulse and then again sends the normal driving pulse. In such circuits, the detection of the rotation or non-rotation of the rotor in response to a driving pulse is therefore effected a long time after the end of this driving pulse. These circuits will be called delayed detection circuits in the following description.

It should be noted that, whatever the kind of control circuit and of adjustment used, the duration of the driving pulses is generally less than the time taken by the rotor to carry out its step. The electric energy supplied to the motor by each driving pulse is as a rule sufficient for the rotor to finish its step due to the kinetic energy which it has accumulated and to a positioning torque which tends to bring it back or maintain it, in the absence of current in the coil, into or in a rest position of stable and definite equilibrium. This positioning torque is created by a special shape given to the pole pieces which surround the rotor of the motor, or by one or more positioning magnets.

The curve 1 of FIG. 1 illustrates diagrammatically the variation in this positioning torque as a function of the angle of rotation a of the rotor between two rest positions corresponding to the points A and B. When this torque is positive, it tends to cause the rotor to turn in the direction of increase of the angle a and, when it is negative, it tends to cause it to turn in the direction of decrease of this angle a.

In the majority of motors used at present in timepieces the rotor turns in steps of 180 degrees, which means that it has two rest positions per revolution. In other types of motor, the step of the rotor corresponds to a rotation of 360 degrees, which means that the rotor has only one rest position.

The period of the positioning torque is equal to the angle between two successive rest positions of the rotor. There is therefore a position of the rotor, represented by the point C in FIG. 1, which corresponds approximately to a rotation of half a step, at which this torque is null and changes sign. The sense of the torque to either side of C is such as to drive the rotor away from C. This point C therefore corresponds to a position of unstable equilibrium of the rotor.

The mechanical load driven by the motor is constituted for a large part by the resisting torque due to the unavoidable friction of the pivots of the rotor and of the toothed wheels which it drives in their bearings, and also by the friction of the teeth of these wheels between them. This frictional torque is represented diagrammatically by the curves 2 and 3 in FIG. 1.

Around the point C of unstable equilibrium there is a zone, defined by the points D and E, in which the frictional torque is greater than the positioning torque. If the energy supplied to the rotor by a driving pulse is sufficient for it to reach and pass the point D, but is not sufficient for it to reach and pass the point E, the rotor then remains blocked in an intermediate position which may be located anywhere between these points D and E.

FIG. 2 illustrates diagrammatically a motor of the type most currently used in electronic timepieces in the situation where its rotor is blocked in such an intermediate position. FIG. 2 shows the coil 11, two pole pieces 12 and 13 which form part of the stator of the motor, and the magnet 14 of the rotor. The magnetization axis of this magnet 14 is represented by the arrow 15, which is directed from its south pole towards its north pole. In this example, the positioning torque of the rotor is created by notches 16 and 17 formed in the pole pieces 12 and 13, respectively.

In normal operation, the control circuit of the motor, not shown in FIG. 2, delivers driving pulses to the coil 11 in response to control pulses supplied, for example, by a time base circuit each time that the rotor is to advance by one step.

All the explanations which are to follow will be given taking such a motor as an example. However, the expert will appreciate that they apply without any difficulty to any type of stepping motor.

For these explanations, it will be assumed that the point A in FIG. 1 corresponds to the position of the rotor in which the magnetization axis of its magnet is represented by the dashed arrow 15′ shown in FIG. 2 and that the rotor has been brought to the position represented by the arrow 15 by a driving pulse designated by the reference 18 in FIG. 3 and applied to the coil 11 so that the pole piece 12 acts as a south magnetic pole and the pole piece 13 acts as a north magnetic pole. The energy supplied to the motor by this pulse has been sufficient for the rotor to reach a position located beyond the point D in FIG. 1, but, for some reason, it has been insufficient for the rotor to go beyond the position corresponding to the point E. The rotor is therefore remained blocked in the intermediate position shown in FIG. 2.

If this situation occurs with an immediate detection control circuit of the kind of that which is described in U.S. Pat. No. 4,212,156 mentioned above, this control circuit sends a correction pulse to the motor as soon as it detects that the rotor has not finished its step. This correction pulse, which is designated by the reference 19 in FIG. 3, has the same polarity as the driving pulse 18 and a duration long enough for causing the rotor to turn by a complete step, from the point A to the point B. The torque created by this pulse is shown by curve 4 in FIG. 1. As, in this case, the rotor is in a position located between the points A and B, this correction pulse is not yet finished when the rotor reaches a point B′ which is the point where the positioning torque and the torque created by the current in the coil cancel each other. The rotor oscillates about this point B′ and, at the instant when the correction pulse ends, it is very possible that the rotor has a speed and a direction of rotation such that it starts off again in the direction of the point A and completes its step in the opposite direction.

This case is illustrated in FIG. 3, in which the references 18 and 19 designate the driving pulse which has brought the rotor into the position of FIG. 2 and the correction pulse, respectively, and in which the curve 20 represents diagrammatically the angular position of the rotor as a function of time.

In such a case, the correction pulse does not achieve its purpose, which is to make up for a preceding driving pulse whose energy has been insufficient to cause the rotor to turn correctly.

The same situation may arise if the rotor is not really stopped at the end of a driving pulse, but its rotation has simply been retarded for one reason or another. In this case likewise, the correction pulse sent by the control circuit produces oscillations of the rotor around the point B′ and the rotor may very well be sent back to the point A at the end of this correction pulse.

In the case where the control circuit of the motor is of the kind of that which is described in U.S. Pat. No. 4,300,223 already mentioned, the detector circuit may not supply its detection signal if the rotor has been blocked in an intermediate position close to the position B. The driving pulse which follows that during which the rotor has been blocked is not then interrupted and the rotor returns to its starting position. If the position in which the rotor is blocked is such that the detector circuit reacts to this situation, the control circuit sends a correction pulse whose effect may be the same as in the cases above.

To sum up, it will be seen that if the rotor of the motor remains blocked in an intermediate position, the known control circuits comprising a circuit detecting the non-rotation of the rotor do not guarantee perfect operation of the motor in all cases.

OBJECTS AND SUMMARY OF THE INVENTION

One object of the present invention is to provide a method of controlling a stepping motor which does not suffer from this serious drawback.

This object is achieved by the claimed method.

another object of the present invention is to propose a system for controlling a stepping motor for carrying this method into effect.

The method consists in producing with the aid of a generator and applying to the motor, pulses which allow release of the rotor when it has remained blocked in an intermediate position in response to a driving pulse. The release pulses are distinct from any correction pulses which are applied in known manner to make up a lost step. The release pulses precede the correction pulses and are preferably of such polarity as to return the rotor to its starting position to ensure correct action of the ensuing correction pulses. This object is achieved by the claimed device.

BRIEF DESCRIPTION OF THE DRAWINGS

The invention will now be described in detail, by way of example, with reference to the drawings, in which.

DESCRIPTION OF THE PREFERRED EMBODIMENT

Figure 4:
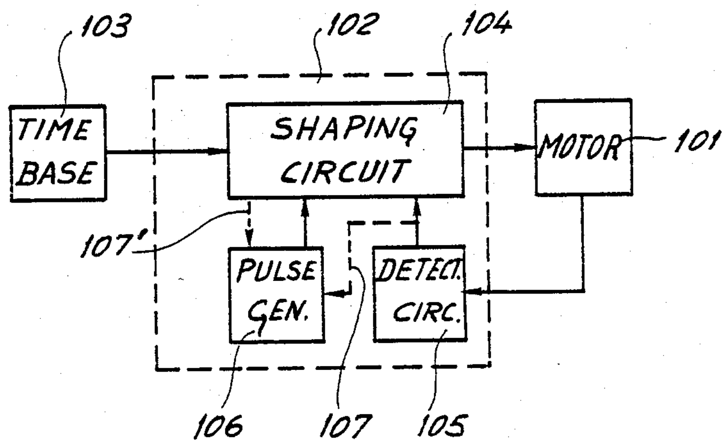
FIG. 4 is a block diagram of a circuit enabling the method according to the invention to be carried into effect.

FIG. 4 is a block diagram of an electronic timepiece taken as an example of an arrangement in which the method according to the invention is carried into effect. This timepiece comprises a stepping motor 101 which drives hands (not shown) displaying the hour, minute and second by way of a gear train.

FIG. 4 shows a control circuit 102 which supplies driving pulses to the motor 101 in response to a control signal delivered by a time base circuit 103 every time the rotor of the motor must turn by one step, that is to say every second in this example. In conventional manner, the time base circuit 103 comprises an oscillator and a frequency dividing circuit. In this example, the control circuit 102 is composed of a shaping circuit 104, a detector circuit 105 and a pulse generator 106.

The detector circuit 105 is connected to the motor 101 and supplies a detection signal at its output if the rotor has not turned in response to the preceding driving pulse. The shaping circuit 104 uses this detection signal in particular to determine the amount of electric energy supplied to the motor by each driving pulse.

Under conditions which will be specified hereinafter, the pulse generator 106 supplies the shaping circuit 104 with pulses which are transmitted to the motor 101 to release its rotor if necessary.

Figure 5A:
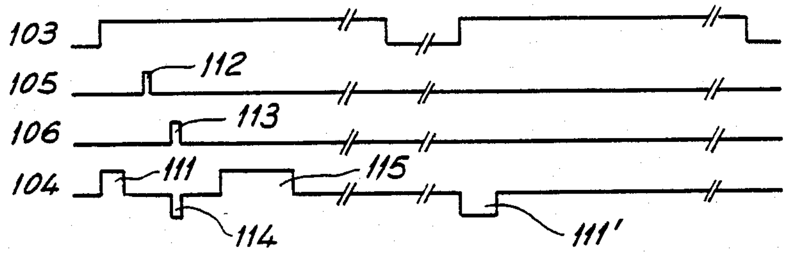
FIGS. 5*a* and 5*b* illustrate signals measured at some points of the circuit of FIG. 4.

FIG. 5*a* illustrates the operation of the circuit of FIG. 4 in the case where the detector circuit 105 is of the same kind as that which is described in the above-mentioned U.S. Pat. No. 4,212,156, that is to say an immediate detection circuit. In FIG. 5*a*, and in FIG. 5*b* which will be described later on, the diagrams designated by the references 103 to 106 represent the signals measured at the outputs of the circuits designated by the same references in FIG. 4.

Each time that the time base circuit 103 supplies a control signal, the shaping circuit 104 delivers a driving pulse 111 of predetermined duration to the motor 101. The detector circuit 105 delivers a signal 112 only if the rotor of the motor 101 does not complete its rotation correctly in response to one of these driving pulses.

As long as the detector circuit 105 does not deliver a signal, the shaping circuit 104 delivers driving pulses of alternate polarities and of predetermined and equal durations to the motor 101. The generator 106, which in this case is connected to the measuring circuit 105 by the connection 107 shown by a broken line in FIG. 4, does not deliver a pulse either. This situation, which is the normal situation, is not illustrated.

FIG. 5*a* illustrates a case in which the rotor does not complete its rotation correctly in response to a driving pulse 111 having a duration which, for example, is the minimum duration which these driving pulses can have.

A certain time after the beginning of the driving pulse 111, the detector circuit 105 delivers a signal 112 which indicates that the rotor has not finished its step. This signal 112 causes the formation of a pulse 113 by the generator 106. This pulse 113, which is of short duration, is transmitted by the shaping circuit 104 to the motor 101 in the form of a pulse 114 having the opposite polarity to that of the driving pulse 111.

The signal 112 also causes the formation by the shaping circuit 104, after the pulse 113, of a pulse 115 having a duration greater than the duration of the pulse 111 and the same polarity as this pulse 111.

Figure 2:
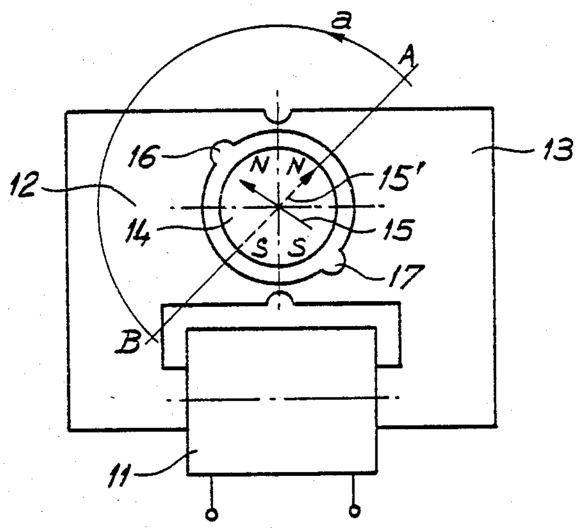
FIG. 2, already mentioned, illustrates diagrammatically a stepping motor of the type most frequently used in electronic timepieces, the rotor of which is blocked in an intermediate position.
Figure 3:
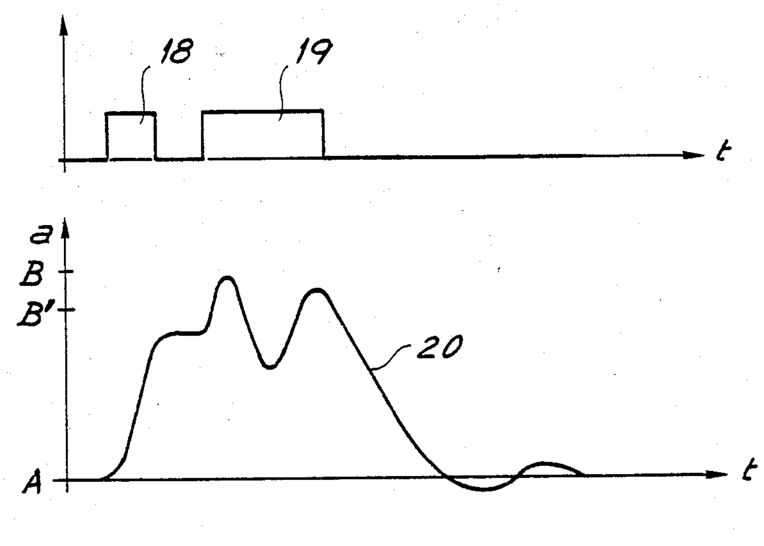
FIG. 3, already mentioned, illustrates the effect of a correction pulse applied to a stepping motor whose rotor is blocked in the position illustrated in FIG. 2.

If the rotor has not completed its step because it has remained blocked in an intermediate position such as that which is shown in FIG. 2, the pulse 114 releases it and causes it to come back to its starting position. The rotor is thus in a well defined position at the moment when the shaping circuit 104 delivers the pulse 115 intended to cause it to make up the step which it has just missed.

If the rotor has come back to its starting position before the pulse 114 is delivered, the latter has no effect and the correction pulse 115 causes the rotation of the rotor normally.

Finally, if the rotor has simply been retarted and it finishes its step after the detector circuit 105 has delivered the signal 112, the release pulse 114 and the correction pulse 115 have no effect.

The signal 112 also acts on the shaping circuit 104 in known way so that the latter increases the duration of the driving pulse which is delivered afterwards. Such a pulse 111' with a duration greater than the duration of the pulse 111, is shown in FIG. 5*a*. It has the opposite polarity to that of the pulse 111.

It is obvious that, whatever the duration of the driving pulses 111 or 111', the detector circuit 105 delivers a signal such as the signal 112 each time that the rotor does not complete its step correctly. Each signal 112 causes the formation of a release pulse such as the pulse 114 and of a correction pulse such as the pulse 115. After each of these signals 112, the shaping circuit 104 delivers at least a predetermined number of driving pulses of the same duration as the pulse 111'. When this number is reached, the shaping circuit 104 brings the duration of the driving pulses back to that of the pulse 111.

Figure 5B:
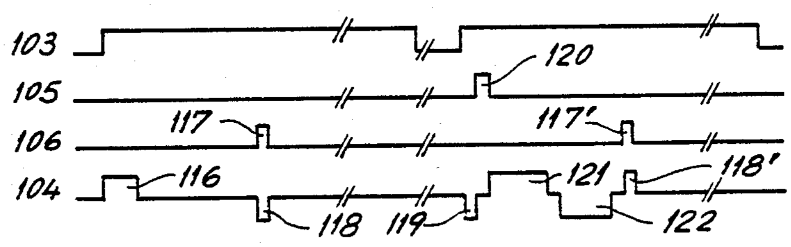

FIG. 5*b* illustrates the operation of the circuit of FIG. 4 in the case where the detector circuit 105 is of the same kind as that which is described in U.S. Pat. No. 4,300,223 mentioned hereinbefore, that is to say a delayed detection circuit.

As in the case of FIG. 5*a*, the shaping circuit 104 delivers to the motor 101 a driving pulse 116 of predetermined duration each time that the time base circuit 103 supplies a control signal. If the rotor of the motor 101 has turned correctly in response to the preceding driving pulse, the detector circuit 105 does not deliver a signal. The generator 106, which in this case is connected to the shaping circuit 104 by the connection 107', also shown by a broken line in FIG. 4, delivers a short pulse designated by the reference 117 after each driving pulse.

The shaping circuit 104 transmits this pulse 117 to the motor 101 in the form of a release pulse 118 having the opposite polarity to that of the driving pulse which it has just delivered. If the rotor of the motor 101 has turned correctly in response to the driving pulse 116, this release pulse 118 has no effect. If, on the other hand, the rotor has remained blocked in the position illustrated in FIG. 2, which is the case in FIG. 5*b*, this pulse 118 causes its release and its return to the position which it had before the driving pulse 116. In this way, when the shaping circuit 104 introduces the following driving pulse 119 with the opposite polarity to that of the driving pulse 116 in response to a fresh control signal supplied by the time base circuit 103, the detector circuit 105 certainly supplies the detection signal 120. The shaping circuit 104 interrupts the driving pulse 119 in response to this detection signal 120 and introduces a correction pulse 121.

This correction pulse 121, which has the same polarity as the pulse 116 and a greater duration than the normal driving pulses, causes the rotor of the motor 101 to execute the rotation which it had not completed in response to the driving pulse 116. The shaping circuit 104 then applies a fresh driving pulse 122 designed to cause the rotor to execute the rotation which it should have executed in response to the driving pulse 119 which has been interrupted. After this pulse 122, the duration of which is greater than that of the driving pulse 116, the generator 106 delivers a short pulse 117' which the shaping circuit 104 transmits to the motor 101 in the form of a release pulse 118'. If the rotor has again remained arrested in an intermediate position in response to the driving pulse 122, this pulse 118' releases it and brings it back to its starting position. The same process then recommences when the circuit 104 introduces the following driving pulse (not shown).

In the two cases described above, it would be possible to arrange the shaping circuit 104 so that it delivers release pulses having the same polarity as the preceding driving pulse. These pulses would have the effect of releasing the rotor and causing it to complete its rotation. It would then obviously no longer be necessary to provide the making-up pulses such as the pulses 115 and 121. It is preferable, however, for reasons of reliability of operation, to make the circuit operate in the manner described with the aid of FIGS. *5a* and *5b*.

Figure 1:
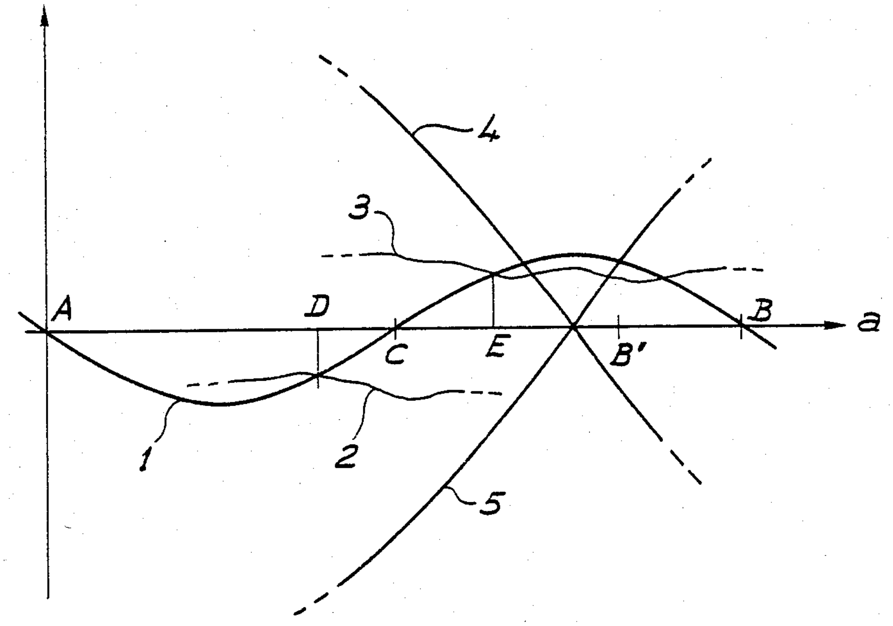
FIG. 1, already mentioned, represents the variation in the positioning torque of a stepping motor as a function of the angle of rotation of the rotor between two rest positions.

The curve 4 of FIG. 1 also represents diagrammatically the torque created by a release pulse having the same polarity as the driving pulse which has brought the rotor into the position in which it has been blocked between points D and E. This torque decreases during the rotation it causes in the direction of the point B and becomes lower than the frictional torque represented by the curve 3. It could therefore happen that this pulse does not completely release the rotor. On the other hand, the torque created by a release pulse having the opposite polarity to that of the driving pulse in response to which the rotor has stopped, which is represented diagrammatically by the curve 5, increases during the rotation it causes in the direction of the print A. This pulse therefore reliably causes the release of the rotor.

Figure 6:
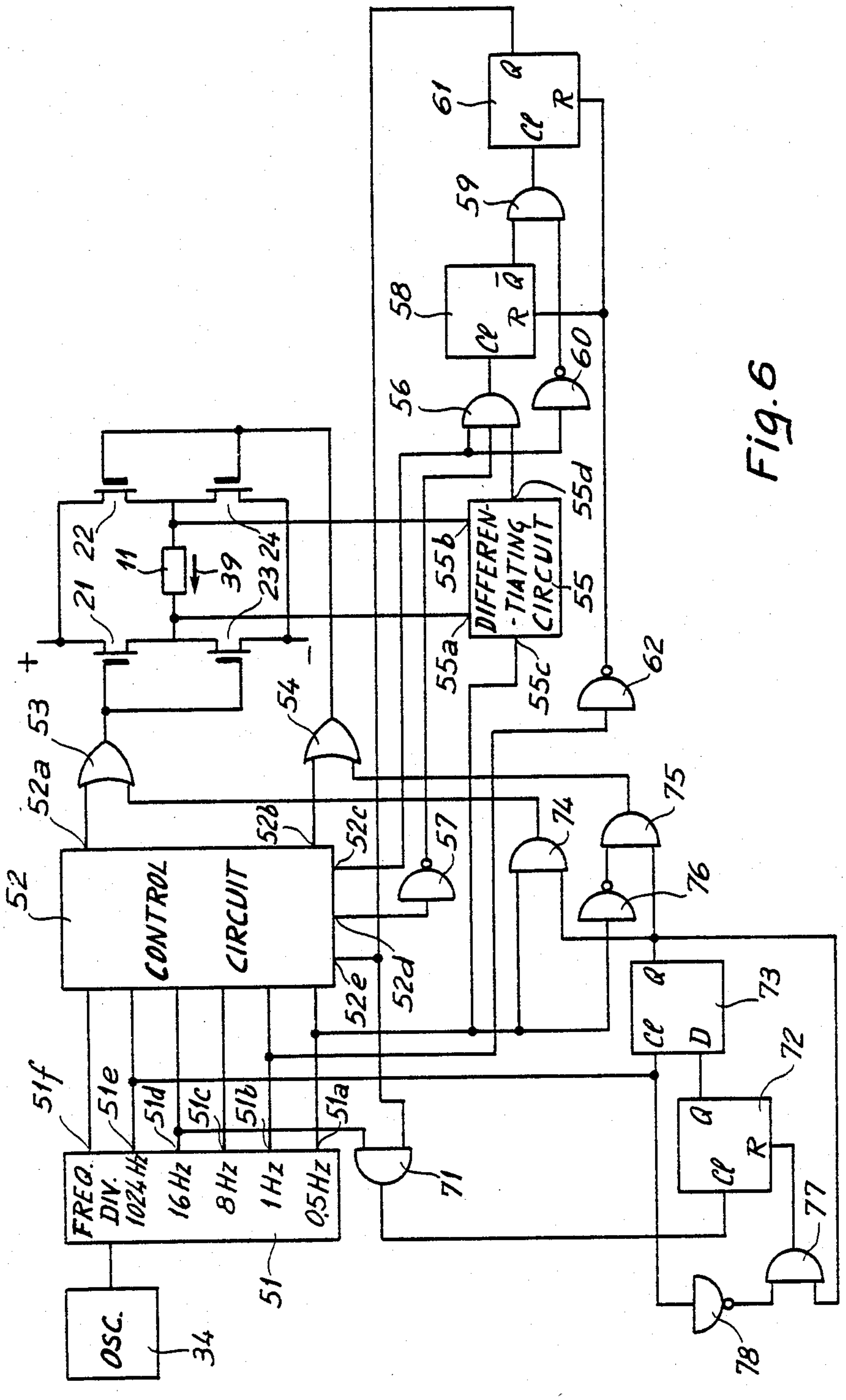
FIG. 6 is a detailed diagram of a first embodiment of a control circuit according to the invention.

FIG. 6 illustrates an example of a control circuit embodying the invention for a stepping motor, in which the detection of the rotation of non-rotation of the rotor takes place immediately after each driving pulse, as in the circuit which is described in the already mentioned U.S. Pat. No. 4,212,156. FIGS. *7a* and *7b* show signals measured at some points of the circuit of FIG. 6 in two cases of operation of this circuit. Each diagram of these FIGS. *7a* and *7b* is designated by the reference of the point in FIG. 6 where the signal which it represents is measured, and the waveform 11 represents the voltage measured across the terminals of the coil of the motor.

The coil 11 of the motor (FIG. 6) is connected in conventional manner in a bridge formed by four MOS transistors 21 to 24. An oscillator 34 is connected to the input of a frequency divider 51, the outputs 51*a* to 51*e* of which deliver, for example, signals having frequencies of 0.5 Hz, 1 Hz, 8 Hz, 16 Hz and 1,024 Hz, respectively. Other outputs, designated together by the reference 51*f*, delivers signals having other frequencies, which will not be detailed here.

All these signals are applied to the inputs of a control circuit 52 which comprises gates, flip-flops and counters, the arrangement of which is described in detail in the already mentioned U.S. Pat. No. 4,212,156. Some of these gates utilize the signals supplied in particular by the outputs 51*f* of the divider 51 to form pulses having different durations. Each time that the 1 Hz signal delivered by the output 51*b* of the divider 51 changes to the "1" state, for example, the circuit 52 delivers a pulse on its output 52*a* or on its output 52*b* according to whether the output 51*a* of the divider 51 is in the "0" state or the "1" state. This pulse is selected among the pulses of different durations mentioned above as a function of the state of an input 52*e* of the circuit 52. This input 52*e* is connected to the output of a circuit detecting the rotation of the rotor which will be described hereinafter.

Each pulse delivered by the output 52*a* of the circuit 52 is transmitted to the gates of the transistors 21 and 23 through an OR gate 53. The coil 11 therefore receives a driving pulse which causes the flow, in the coil 11, of a current in the direction of the arrow 39. Likewise, each pulse delivered by the output 52*b* is transmitted to the gates of the transistors 22 and 24 through an OR gate 54, which causes the application to the coil 11 of a driving pulse having the opposite polarity to the preceding one and the flow in this coil 11 of a current in the opposite direction to that of the arrow 39.

Normally, the input 52*e* of the circuit 52 is in the logical "0" state and the pulses delivered by the output 52*a* or 52*b* have a relatively short duration, for example of 5.1 milliseconds. When the rotor does not finish its step correctly in response to a driving pulse, the output of the rotation detector, and therefore the input 52*e* of the circuit 52, change over to the "1" state about ten milliseconds after the beginning of this driving pulse. When, after this change-over to the "1" state, the output 51*c* of the divider 51 changes over to the "1" state, that is to say 62.5 milliseconds after the beginning of the driving pulse, the output 52*a* or 52*b* which has delivered the last pulse delivers a fresh pulse with a duration, for example, of 7.8 milliseconds. This pulse, called the correction pulse, is designed to cause the rotor to execute the step which it has just missed.

From this moment, and for a predetermined time, the duration of the pulses delivered alternately by the inputs 52*a* and 52*b* in response to the change-over of the 1 Hz signal to the "1" state is increased to, for example, 7.8 milliseconds. If the input 52*e* remains in the "0" state throughout the predetermined time, that is to say if the rotor has turned correctly, the duration of the pulses delivered by the outputs 52*a* and 52*b* is brought back to 5.1 milliseconds.

The circuit 52 also comprises two outputs 52*c* and 52*d*, each of which deliver a pulse each time that the output 52*a* or the output 52*b* delivers a normal pulse. The pulse delivered by the output 52*c* has a duration of about ten milliseconds and the pulse delivered by the output 52*d* has a duration equal to that of the pulse delivered by the output 52*a* or 52*b*.

The terminals of the coil 11 is connected to the inputs 55*a* and 55*b* of a circuit 55 which is also described in U.S. Pat. No. 4,212,156. This circuit 55 comprises a differentiating circuit and transmission gates controlled by the 0.5 Hz signal which is applied to an input 55*c*. According to the state of this 0.5 Hz signal, the differentiating circuit is connected to one or the other of the terminals of the coil 11. This differentiating circuit is arranged so as to supply a pulse at the output 55*d* each time that the current in the coil 11 passes through a minimum.

This pulse is applied to a first input of an AND gate 56 having second and third inputs respectively connected to the output 52*c* and, through an inverter 57, to the output 52*d* of the control circuit 52. The output of the gate 56 is connected to the clock input Cl of a flip-flop 58 of T type. The output $\overline{Q}$ of the flip-flop 58 is connected to a first input of an AND gate 59, the second input of which is connected to the output 52*c* of the circuit 52 through an inverter 60. The output of the gate 59 is connected to the clock input Cl of a flip-flop 61, likewise of T type, the output Q of which is connected to the input 52*e* of the circuit 52. The reset inputs R of the flip-flops 58 and 61 are connected to the output 51*b* of the divider 51 through an inverter 62.

The circuit 55, the gates 56 and 59, the inverters 57 and 60 and the flip-flops 58 and 61 can be found again, with other references, in U.S. Pat. No. 4,212,156 and form a rotation detector for the rotor which functions in the following manner:

The pulse normally supplied by the output 55*d* of the circuit 55 during each driving pulse at the moment when the current in the coil 11 passes, in well-known manner, through a minimum is blocked by the gate 56, whose input connected to the inverter 57 is at this moment in the "0" state.

Figure 7B:
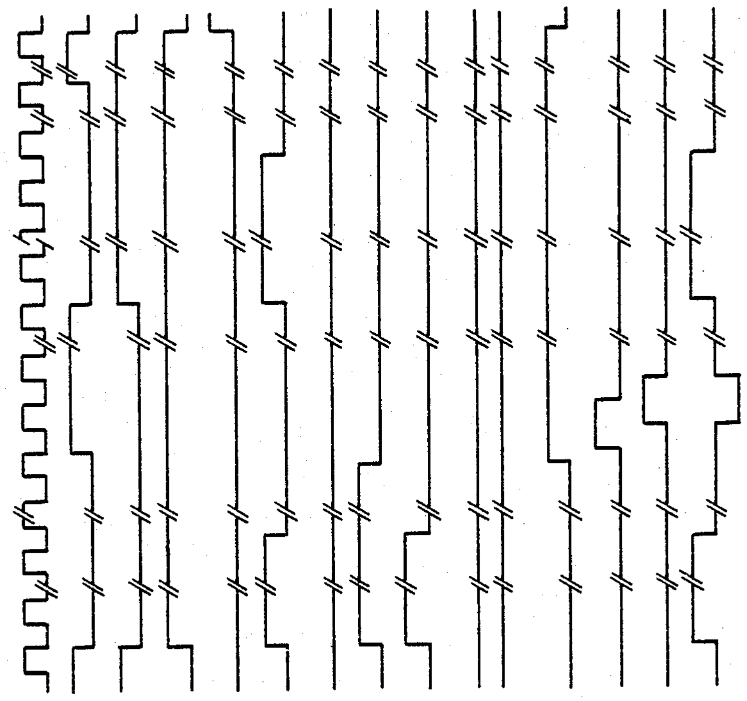
FIGS. 7*a* and 7*b* are diagrams representing signals measured at some points of the circuit of FIG. 6.
Figure 7A:
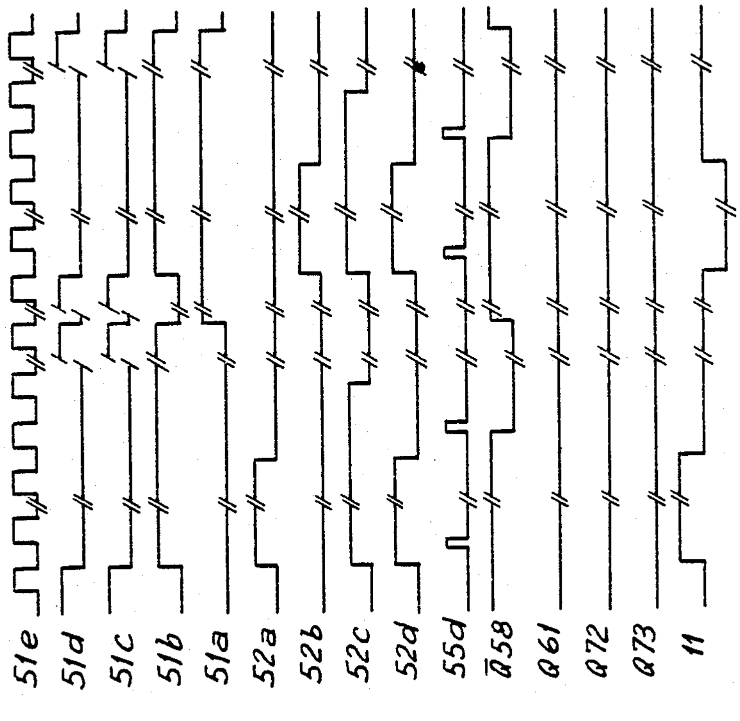

If the rotor finishes its step correctly, the current induced in the coil 11 by the oscillations which it performs after the end of the driving pulse presents a minimum at an instant arising less than ten milliseconds after the beginning of this driving pulse. The pulse supplied at this instant by the output 55*d* of the circuit 55 passes through the gate 56 and causes change-over of the flip-flop 58, the output $\overline{Q}$ of which passes to the "0" state. This zero state blocks the gate 59. The flip-flop 61, the output Q of which constitutes the output of the rotation detector, cannot therefore change over when the output 52*c* of the circuit 52 changes to the "0" state about ten milliseconds after the beginning of the driving pulse. The input 52*e* of the circuit 52 therefore remains in the "0" state with the above-described consequences. This case is illustrated by FIG. 7*a*.

If, on the other hand, the rotor does not turn correctly in response to a driving pulse because of too high a mechanical load, the minimum of the current induced in the coil 11 by the oscillations of the rotor occurs more than ten milliseconds after the beginning of the driving pulse. The flip-flop 58 is therefore still in its inoperative state at the moment when the output 52*c* of the circuit 52 changes to the "0" state again. This change to the "0" state causes the change-over of the flip-flop 61 through the inverter 60 and the gate 59. The input 52*e* of the circuit 52, which is connected to the output Q of the flip-flop 61 therefore changes to the "1" state, with the above-described consequences.

This situation also occurs in the case where the rotor remains blocked in a position such as that which is shown in FIG. 2. In this case, the output 55*d* of the circuit 55 does not produce a pulse because the current flowing in the coil 11 does not present a minimum. This case is illustrated by FIG. 7*b*.

The flip-flop 58 or the flip-flop 61 which has changed over as described above is restored to its inoperative state by the "1" state which is applied at its input R by the inverter 62 when the 1 Hz signal changes to the "0" state again.

In addition to these circuits, which can be found again in U.S. Pat. No. 4,212,156 with other references, the circuit of FIG. 6 comprises an AND gate 71 having two inputs respectively connected to the output Q of the flip-flop 61 and to the output 51*d* of the divider 51. The output of this gate 71 is connected to the clock iunput Cl of a flip-flop 72 of T type. The clock input Cl of a flip-flop 73 of D type is connected to the output 51*e* of the divider 51 and its input D is connected to the output Q of the flip-flop 72. The output Q of the flip-flop 73 is connected to the first inputs of two AND gates 74 and 75. The output 51*a* of a divider 51 is connected to the second input of the gate 74 and, through an inverter 76, to the second input of the gate 75. The outputs of these gates 74 and 75 are respectively connected to the second inputs of the gates 53 and 54.

The reset input R of the flip-flop 72 is connected to the output of an AND gate 77, a first input of which is connected to the output of the flip-flop 73 and a second input of which is connected to the output 51*e* of the divider 51 through an inverter 78.

These circuits form a pulse generator which performs the function of the generator 106 of FIG. 4 and which operates in the following manner:

If the rotor does not turn correctly in response to a driving pulse, the output Q of the flip-flop 61 changes to the "1" state in the manner described above and the output of the gate 71 likewise changes to the "1" state at the moment when the output 51*d* itself changes to the "1" state, that is to say about thirty milliseconds after the beginning of the driving pulse. The flip-flop 72 therefore changes over at this moment and its output Q changes to the "1" state.

When the input Cl of the flip-flop 73 likewise changes to the "1" state about a half millisecond later, this flip-flop 73 also changes over and its output Q changes to the "1" state. When the output 51*e* of the divider 51 changes to the "0" state again, another half millisecond later, the reset input R of the flip-flop 72 changes to the "1" state and its output Q changes to the "0" state. When, a half millisecond later still, the output 51*e* of the divider 51 changes to the "1" state again, the output Q of the flip-flop 73 changes again to the "0" state. This output Q of the flip-flop 73 therefore delivers a pulse with a duration of about one millisecond which begins about thirty milliseconds after the commencement of the driving pulse. This pulse corresponds to the pulse 113 of FIG. 5*a*.

If the output 51*a* of the divider 51 is in the "0" state, that is to say if it is the output 52*a* of the control circuit 52 which has delivered the pulse in response to which the rotor has not rotated correctly, the pulse delivered by the output Q of the flip-flop 73 is transmitted to the gates of the transistors 22 and 24 through the gates 75 and 54. This case is illustrated by FIG. 7*b*.

If, on the other hand, the output 51*a* of the divider 51 is in the "1" state, that is to say if it is the output 52*b* of the control circuit 52 which has delivered the pulse in response to which the rotor has not rotated correctly, the pulse delivered by the output Q of the flip-flop 73 is transmitted to the gates of the transistors 21 and 23 through the gates 74 and 53.

In both cases, this pulse delivered by the output Q of the flip-flop 73 causes the passage in the coil 11 of a current pulse in the opposite direction to that of the driving pulse which has not succeeded in causing the rotor to rotate correctly.

If the rotor has remained blocked in an intermediate position in response to this driving pulse, this pulse of about one millisecond causes the release of the rotor and its rotation in the direction which brings it back to its starting position. When, about thirty milliseconds later, the circuit 52 delivers the above-described correction pulse, the rotor is in the position in which this correction pulse causes its advance by a single step with reliability.

Figure 9:
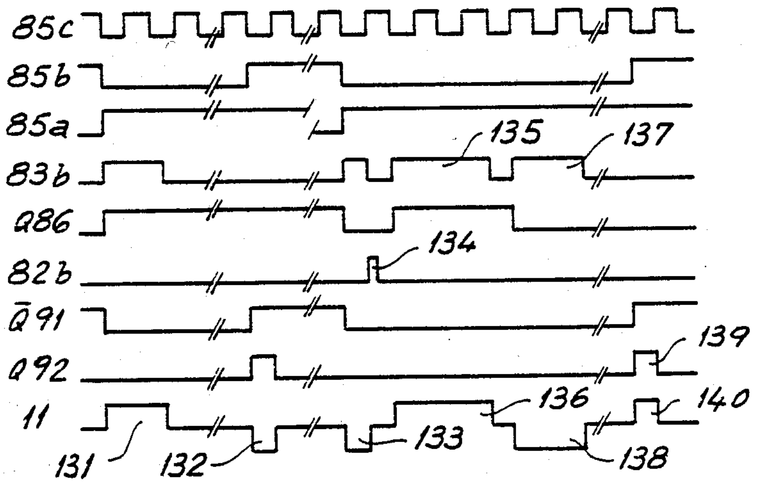
FIG. 9 is a diagram representing signals measured at some points of FIG. 8.
Figure 8:
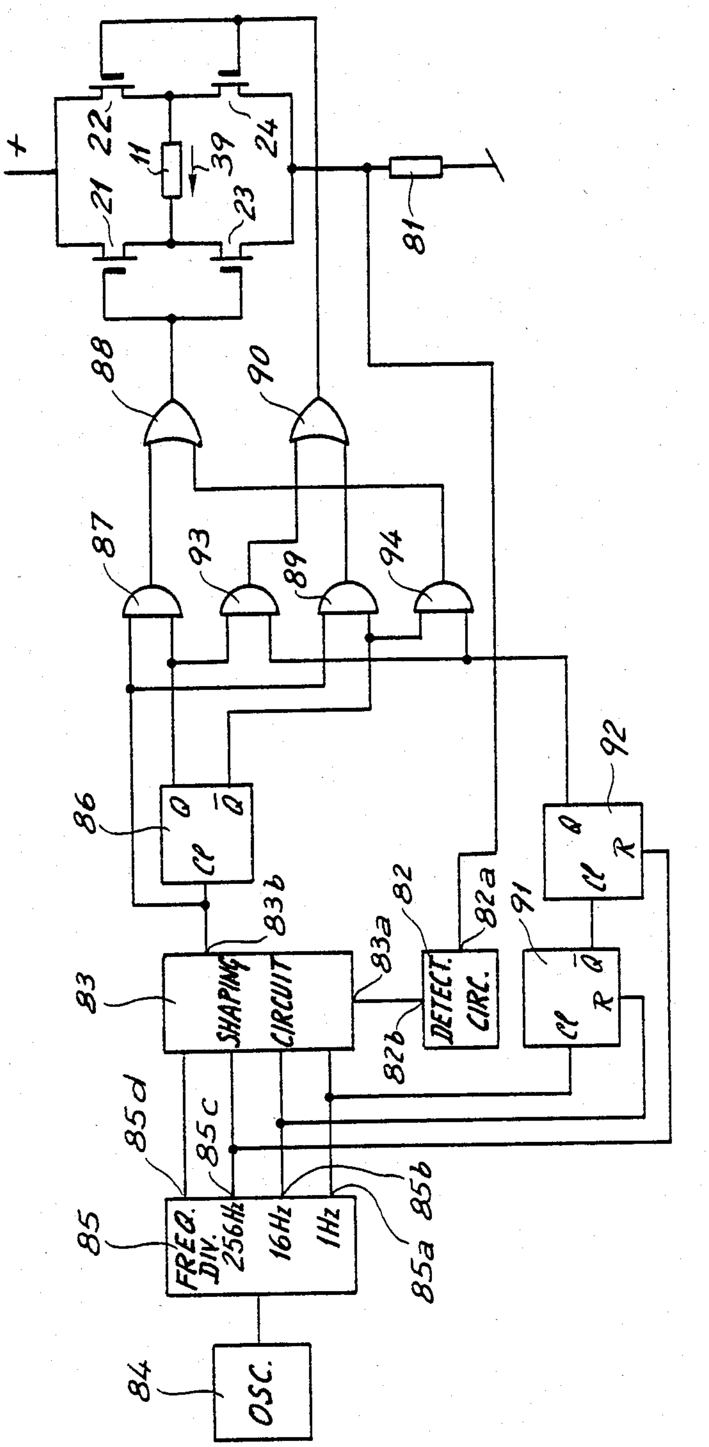
FIG. 8 is a diagram of a second embodiment of a control circuit according to the invention.

FIG. 8 illustrates another example of a control circuit embodying the invention for a stepping motor, in which the detection of the rotation or non-rotation of the rotor in response to a driving pulse takes place at the beginning of the following driving pulse, as in U.S. Pat. No. 4,300,223 already mentioned. FIG. 9 shows signals measured at some points of the circuit of FIG. 8. Each diagram of FIG. 9 is designated by the reference of the point in FIG. 8 where the signal which it represents is measured, and the waveform 11 again represents the voltage across the terminals of the coil of the motor.

As in the case of FIG. 6, this coil 11 is connected in a bridge formed by the four MOS transistors 21 to 24 identical to the transistors bearing the same references in FIG. 6. However, in FIG. 8, the sources of the transistors 23 and 24 are connected to the negative pole of the supply source through a measuring resistor 81.

The sources of the transistors 23 and 24 are also connected to an input 82a of a detector circuit 82 which comprises a reference voltage source and a voltage comparator the arrangement of which is described in U.S. Pat. No. 4,300,223 already mentioned. A shaping circuit 83 receives signals having different frequencies from a time base circuit formed by an oscillator 84 and a frequency divider 85. The frequency divider 85 delivers in particular at its outputs 85a, 85b and 85c signals having a frequency of 1 Hz, 16 Hz and 256 Hz, respectively. Moreover, other outputs designated together by the reference 85d deliver signals having other frequencies which will not be described here.

The shaping circuit 83 utilizes these various signals to deliver at its output 83b a pulse of predetermined duration in response to each change to the logical "1" state of the output 85a of the divider 85. Each of these pulses causes the change-over of a flip-flop 86 of T type whose clock input Cl is connected to the output 83b of the circuit 83. The outputs Q and $\overline{Q}$ of this flip-flop 86 therefore assume the one the logical "0" state and the other the logical "1" state alternately for one second.

According to the output Q and $\overline{Q}$ of the flip-flop 86 which changes to the "1" state, the pulse supplied by the output 83b of the circuit 83 is transmitted to the gates of the transistors 21 and 23 through an AND gate 87 and an OR gate 88, or to the gates of the transistors 22 and 24 through an AND gate 89 and an OR gate 90. A current therefore passes into the coil 11 in the direction of the arrow 39 or in the opposite direction.

The circuit 82 is arranged to compare the value of the measuring voltage which it receives from the resistor 81 at its input 82a with the value of the reference voltage, in response to a signal which it receives from the circuit 83, through a connection not shown, about two milliseconds after the beginning of each driving pulse. If the value of this measuring voltage is lower than the value of the reference voltage at the instant of comparison, this indicates that the rotor of the motor has turned correctly in response to the preceding driving pulses. The circuit 82 then does not deliver a detection signal to the circuit 83 and the latter therefore leaves the pulse which it delivers at its output 83b to end normally after lasting, for example, 5.1 milliseconds. Such a pulse is represented in FIG. 9 with the reference 131.

The control circuit of FIG. 8 also comprises a pulse generator formed by two flip-flops 91 and 92 of T type. The clock input Cl of the flip-flop 91 is connected to the output 85a of the frequency divider 85 and its reset input R is connected to the output 85b of the divider 85. The output $\overline{Q}$ of this flip-flop 91 therefore changes to the "0" state each time that the output 85a of the divider 85 changes to the "1" state, that is to say at the beginning of each driving pulse, and remains there about 30 milliseconds, that is to say until the output 85b of the divider 85 changes to the "1" state.

The clock input Cl of the flip-flop 92 is connected to the output $\overline{Q}$ of the flip-flop 91 and its reset input R is connected to the output 85c of the divider 85. The output Q of the flip-flop 92 therefore changes to the "1" state about thirty milliseconds after the beginning of each driving pulse and remains in this state about two milliseconds.

This output Q of the flip-flop 92 is connected to the first inputs of two AND gates 93 and 94. The second inputs of the gates 93 and 94 are connected to the output Q and the output $\overline{Q}$, respectively, of the flip-flop 86. The output of the gate 93 is connected to the second input of the gate 90 and the output of the gate 94 is connected to the second input of the gate 88.

In this way, if the output Q of the flip-flop 86 is in the "1" state, that is to say if the last driving pulse has been applied to the motor so that the current in the coil 11 flows in the direction of the arrow 39, the two milliseconds pulse supplied by the output Q of the flip-flop 92 is transmitted to the coil 11 by the gates 93 and 90 in the form of a release pulse which causes the passage of a current in the opposite direction to that of the arrow 39. On the other hand, if the output $\overline{Q}$ of the flip-flop 86 is in the "1" state, that is to say if the last driving pulse has been applied to the motor so that the current in the coil 11 flows in the opposite direction to that of the arrow 39, the two millisecond pulse supplied by the output Q of the flip-flop 92 is transmitted to the motor by the gates 94 and 88 in the form of a release pulse which causes the passage of a current in the direction of the arrow 39.

The release pulse is therefore always applied to the motor with a polarity opposite to that of the preceding driving pulse.

In the case of FIG. 9, the release pulse which follows the driving pulse 131 is designated by the reference 132. It will be assumed for the rest of this description that the rotor has remained blocked in response to this driving pulse 131. The release pulse 132 therefore brings it back to the position which it had before the beginning of this pulse 131.

When, one second later, the output 85a of the frequency divider 85 changes to the "1" state, the shaping circuit 83 begins to deliver a pulse. This causes the flip-flop 86 to change over and a driving pulse, designated by the reference 133, begins to be applied to the coil 11. However, as the rotor of the motor is not in the position which it ought to have, the current in the coil 11 increases too rapidly.

About two milliseconds after the beginning of the driving pulse 133, the detector circuit 82 establishes that the measuring voltage is higher than the reference voltage and it delivers at its output 82b a detection signal designated by the reference 134. This signal 134 causes the interruption of the pulse present at the output 83b of the shaping circuit 83 and, therefore, the interruption of the driving pulse 133.

The shaping circuit 83 then delivers a pulse 135 with a duration of, for example, 7.8 milliseconds. This pulse 135 causes a fresh change-over of the flip-flop 86. The coil 11 therefore receives a correction pulse 136 having a duration of 7.8 milliseconds and the same polarity as the driving pulse 131 which has not succeeded in causing the rotor to rotate correctly.

After this pulse 135, the shaping circuit delivers a fresh pulse, designated by the reference 137, which causes the flip-flop 86 to change over once more and causes the formation of a driving pulse 138 intended to bring the rotor to the position which it should have adopted in response to the driving pulse 133 if the rotor had rotated correctly in response to the pulse 131.

As in the preceding case, the pulse generator formed by the flip-flops 91 and 92 then delivers a pulse of about two milliseconds designated by the reference 139. This pulse causes the formation of a release pulse 140 which, as hereinbefore, has the opposite polarity to that of the immediately preceding driving pulse 138. This release pulse 140 has no effect if the rotor has rotated correctly in response to the driving pulse 138. On the other hand, if the rotor has remained blocked in an intermediate position in response to this driving pulse 138, the release pulse 140 brings it back to its starting position. The process described above then recommences at the beginning of the following driving pulse (not shown).

I claim:

1. Method for controlling a stepping motor having a coil, a rotor magnetically coupled to said coil and means for bringing said rotor into, or maintaining it in, at least one rest position in the absence of any other influence, comprising the steps of:

applying a driving pulse to said coil each time the rotor is to turn by one step;

producing a detection signal if said rotor has not correctly completed its step in response to said driving pulse;

applying a release pulse to said coil in response to said detection signal for causing said rotor to be released if it has been blocked during said step; and then applying a correction pulse to said coil in response to said detection signal.

2. The method of claim 1, wherein said release pulse is applied to said coil with the opposite polarity to that of the immediately preceding driving pulse.

3. Method for controlling a stepping motor having a coil, a rotor magnetically coupled to said coil and means for bringing said rotor into, or maintaining it in, at least one rest position in the absence of any other influence, comprising the steps of:

applying a driving pulse to said coil each time the rotor is to turn by one step;

applying a release pulse to said coil after each driving pulse for causing said rotor to be released if it has been blocked during said step;

producing a detection signal if said rotor has not correctly completed its step in response to said driving pulse; and applying a correction pulse to said coil in response to said detection signal.

4. The method of claim 3, wherein said release pulse is applied to said coil with the opposite polarity to that of the immediately preceding driving pulse.

5. Device for controlling a stepping motor having a coil, a rotor magnetically coupled to said coil and means for bringing said rotor into, or maintaining it in, at least one rest position in the absence of current in said coil, comprising:

means for applying a driving pulse to said coil each time the rotor is to turn by one step;

means for producing a detection signal if said rotor has not correctly completed its step in response to said driving pulse;

generator means for applying a release pulse to said coil in response to said detection signal for causing said rotor to be released if it has been blocked during said step;

and means for applying a correction pulse to said coil in response to said detection signal after said release pulse.

6. The device of claim 5, wherein said release pulse has the opposite polarity of the immediately preceding driving pulse.

7. Device for controlling a stepping motor having a coil, a rotor magnetically coupled to said coil and means for bringing said rotor into, or maintaining it in, at least one rest position in the absence of current in said coil, comprising:

means for applying a driving pulse to said coil each time the rotor is to turn by one step;

generator means for applying a release pulse to said coil after each driving pulse for causing said rotor to be released if it has been blocked during said step;

means for producing a detection signal if said rotor has not correctly completed its step in response to said driving pulse; and means for applying a correction pulse to said coil in response to said detection signal.

8. The device of claim 7, wherein said release pulse has the opposite polarity of the immediately preceding driving pulse.

* * * * *